United States Patent
Long et al.

(10) Patent No.: US 6,552,657 B2
(45) Date of Patent: *Apr. 22, 2003

(54) DUAL-IGNITER AIRBAG CONTROL SWITCH

(75) Inventors: Steven M. Long, Ruidoso, NM (US); John P. Malone, Arlington, TX (US)

(73) Assignee: A.O.I. Electrical, Inc., Keller, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,750

(22) Filed: Dec. 27, 2001

(65) Prior Publication Data

US 2002/0053790 A1 May 9, 2002

Related U.S. Application Data

(63) Continuation of application No. 09/487,532, filed on Jan. 19, 2000, now Pat. No. 6,452,486.
(60) Provisional application No. 60/116,554, filed on Jan. 21, 1999.

(51) Int. Cl.$^7$ .............................................. B60Q 1/00
(52) U.S. Cl. ..................... 340/438; 307/10.1; 280/735
(58) Field of Search ................... 340/438, 436, 340/425.5; 307/10.1, 39; 280/735, 732, 734, 728.1

(56) References Cited

U.S. PATENT DOCUMENTS

| | | | | |
|---|---|---|---|---|
| 3,703,702 A | * | 11/1972 | Arai | 280/735 |
| 3,728,617 A | * | 4/1973 | Potter | 324/508 |
| 3,767,002 A | * | 10/1973 | Gillund | 280/735 |
| 4,258,931 A | * | 3/1981 | Lee et al. | 280/734 |
| 4,454,398 A | * | 6/1984 | Aschenbach et al. | 174/52.3 |
| 4,808,842 A | * | 2/1989 | Hughes | 219/133 |
| 5,424,584 A | * | 6/1995 | Matsuda et al. | 280/735 |
| 5,544,914 A | * | 8/1996 | Borniski et al. | 180/282 |
| 5,668,528 A | * | 9/1997 | Kitao et al. | 180/271 |
| 5,879,024 A | * | 3/1999 | Estep | 116/202 |
| 5,892,433 A | * | 4/1999 | Fulda | 180/282 |
| 5,918,899 A | * | 7/1999 | Watanabe | 280/735 |
| 6,040,637 A | * | 3/2000 | Paganini et al. | 280/728.1 |
| 6,043,566 A | * | 3/2000 | Bryant et al. | 280/728.1 |
| 6,145,874 A | * | 11/2000 | Modzelewski et al. | 250/222.1 |
| 6,198,999 B1 | * | 3/2001 | Ando | 180/271 |

* cited by examiner

Primary Examiner—Nina Tong
(74) Attorney, Agent, or Firm—Howison, Thoma & Arnott, L.L.P.

(57) ABSTRACT

A dual-igniter airbag control switch is provided for a motor vehicle airbag system having a module with a plurality of igniters for causing an airbag to inflate, a diagnostic monitor that determines if a collision is occurring and initiates the igniters, and first and second wires extending between each of the igniters and the monitor for conveying signals between the module and the monitor. The control switch comprises a manually operable switch having portions connected to each of the first wires, for selectively providing continuity in the first wires between the monitor and each of the igniters while in an on position and breaking continuity of the first wires between the monitor and each of the igniters while in an off position. A resistor is connected to each of the second wires and connected to the switch, so that while in the off position, the switch places the resistors in series between the first and second wires and the monitor, each of the resistors having an impedance similar to that of one of the igniters, so as to provide a false indication to the monitor that the continuity exists with the igniters while the switch is in the off position.

10 Claims, 1 Drawing Sheet

DUAL-IGNITER AIRBAG CONTROL SWITCH

CROSS-REFERENCE TO RELATED APPLICATIONS

This application is a Continuation of pending U.S. patent application Ser. No. 09/487,532, filed Jan. 19, 2000 entitled "DUAL-IGNITER AIRBAG CONTROL SWITCH," now U.S. Pat. No. 6,452,436 and is related to, and claims the benefits of priority from, U.S. Provisional Patent Application Serial No. 60/116,554, entitled "DUAL-IGNITER AIRBAG CONTROL SWITCH," filed Jan. 21, 1999.

TECHNICAL FIELD OF THE INVENTION

This invention relates in general to electrical control systems and in particular to devices for controlling automotive supplementary restraint systems.

BACKGROUND OF THE INVENTION

Since the early 1990's, automobile manufacturers selling cars in the United States have been required to equip the cars with supplementary restraint systems (airbags). One or more airbags are stored in a forward position from the front seated passengers. The vehicle's computer system monitors activity to the automobile and initiates necessary deployments of the airbag by sending signals through the circuitry to the airbag module. By design, the rapid inflation of the airbag protects the passenger from contact with the vehicle's steering wheel, dashboard, windshield, or other components.

One problem associated with these airbags is the growing safety concerns for smaller-sized adults, children seated in the front passenger seat of the vehicle and children in child safety seats secured in the front passenger seat of the vehicle. During the rapid and violent inflation, the airbag has potential to do harm to these particular classes of passengers.

Automotive manufacturers have offered switches as an option for disabling a single airbag having a single igniter. Airbags having multiple stage igniters have now been introduced. A multiple stage igniter has two igniters. At a low speed collision, only one of the igniters may ignite to inflate the airbag, while at higher speeds, both igniters actuate to inflate the bag. The single igniter inflates the airbag with less force than the two combined. To applicant's knowledge, prior to applicant's invention, manufacturers did not offer disabling switches for dual stage igniters.

SUMMARY OF THE INVENTION

In this invention, a switch allows a request from the vehicle's computer system to inflate the airbags to be over-ridden and the airbag prevented from inflating. Similarly, the switch can be positioned to have the vehicle computer system and airbag modules work without interruption and function as normal. In the preferred embodiment, the vehicle's original circuit between the computer system and the airbag module is broken. A switching device is connected in this created gap, causing the vehicle's circuit to run through the switching device. The switching device allows an operator to select whether the computer system's signals will pass through to the airbag module uninterrupted or be altered. The device may work as an over-ride of the computer's request by the operator selected request. The switching device works with more than one airbag, and it also is operative with dual stage modules.

DETAILED DESCRIPTION OF THE INVENTION AND BEST MODE

Figure 1:
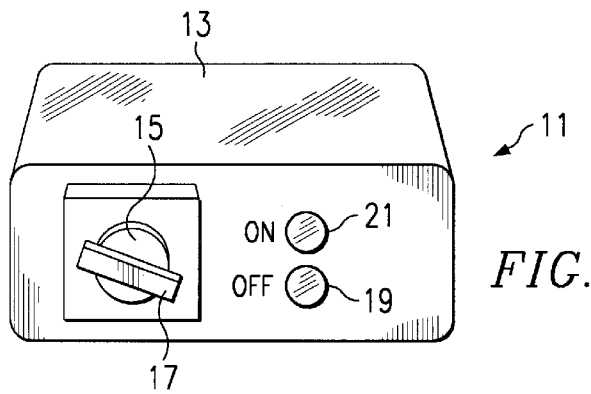
FIG. 1 is a schematic front view of one embodiment of a switch constructed in accordance with the invention.

Referring to FIG. 1, a device 11 for controlling the deployment of an automotive supplementary restraint system (airbag) is shown. Device 11 has a rectangular housing 13 with a two-position ("on" and "off") key switch 15 on a front face. A removable key 17 is provided for actuating switch 15. Each position of switch 15 has a light emitting diode (LED) 19, 21 for visual confirmation of the position selected. Although switch 15 only has two positions in the embodiment shown, it could have other positions depending upon the configuration of the airbag system.

Figure 2:
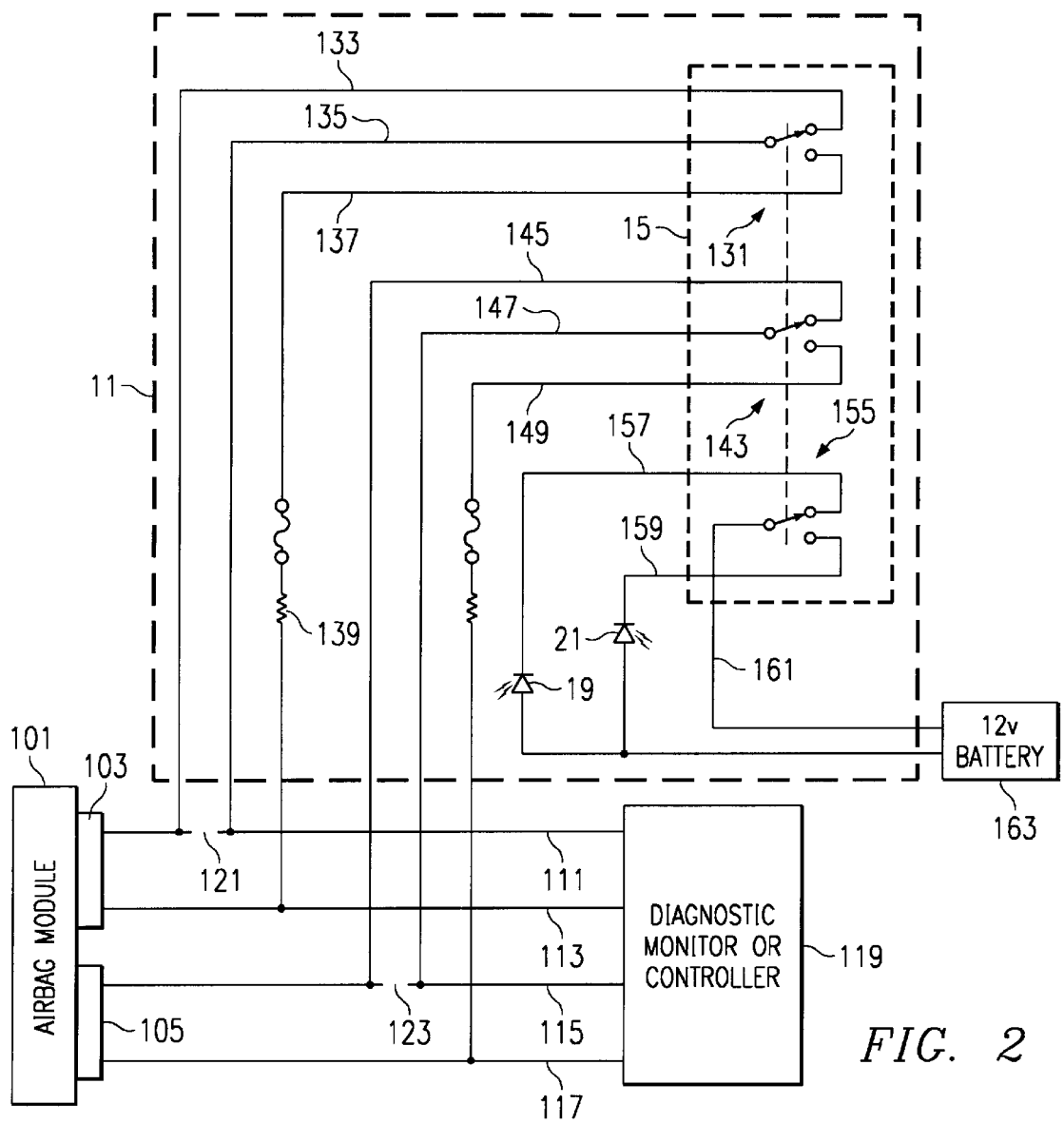
FIG. 2 is an electrical diagram showing the switch of FIG. 1 connected to an airbag.

Referring now to FIG. 2, an electrical diagram for connecting switch 11 to a single airbag module 101 having two igniters 103, 105 is shown. Igniters 103, 105 may be used for various reasons including deployment of module 101 at different velocities. Typically, a sensor will determine the severity of the impact of the vehicle. If the impact is less severe, only one of the igniters 103, 105 ignites to inflate airbag 101. If the impact is more severe, both igniters 103, 105 ignite to inflate airbag 101. Each igniter 103, 105 is connected through a pair of wires 111, 113 and 115, 117, respectively, to a diagnostic monitor or controller 119. Monitor 119 is the vehicle's system computer that monitors the status of module 101 among other functions. Without device 11 (FIG. 1), module 101, igniters 103, 105, and monitor 119 would be connected directly to one another through wires 111–117. However, with device 11, wires 111 and 115 are interrupted at breaks 121, 123, respectively, and connected to device 11.

In the embodiment shown in FIG. 2, switch 15 is a conventional triple-pole, double-throw switch. Switch 15 has a first pole 131 with leads or wires 133, 135, 137. Wires 133, 135 are connected to break 121 in wire 111, and wire 137 is connected to wire 113. Wire 137 has a resistor 139 that places a load that is the same as the impedance of the airbag module 101 so that the diagnostic monitor 119 does not register a fault. Wire 137 also has a fuse 141 in series with resistor 139. Switch 15 has a second pole 143 with wires 145, 147, 149. Wires 145, 147 are connected to break 123 in wire 115, and wire 149 is connected to wire 117. Like wire 137, wire 149 has a resistor 151 in series with a fuse 153. Switch 15 has a third pole 155 with wires 157, 159, 161. Each wires 157, 159 has an LED 19, 21, respectively, which are connected in parallel to a 12-volt DC battery 163. Wire 161 is connected to ground. Preferably, wires 133, 135, 137, 145, 147, 149, 157, 159, 161 exit the housing 13 through the back face.

In operation, device 11 may be turned off to prevent airbag module 101 from deploying in the event of a collision, or turned on to allow module 101 to deploy. When device 11 is "on" (FIG. 2), poles 131, 143, 155 are simultaneously thrown or actuated to the upper positions. This allows the circuit to be completed between module 101 and monitor 119 through wires 111, 133, 135 and wires 115, 145, 147. At the same time, pole 155 activates LED 19 to emit a green light to optically inform the user that the airbag 101 is active and ready to deploy.

When device 11 is "off" (not shown), poles 131, 143, 155 are simultaneously thrown to the lower positions. This interrupts the circuit between module 101 and monitor 119 at breaks 121, 123. Pole 155 activates LED 21 to emit a yellow light to inform the user that airbag 101 is inactive and will not deploy.

While the invention has been shown or described in only one of its forms, it should be apparent to those skilled in the art that it is not so limited, but is susceptible to various changes without departing from the scope of the invention. For example, the device shown and described could be easily reconfigured for multiple airbag modules, multiple igniters or any combinations thereof.

What is claimed is:

1. In a motor vehicle airbag system, having a module with a plurality of igniters for causing an airbag to inflate, a multi-function vehicle system computer that monitors the status of the module, and first and second wires extending between each of the igniters and the vehicle system computer for conveying signals between the module and the vehicle system computer, the improvement comprising:

a manually operable switch having portions connected to each of the first wires, for selectively providing continuity in the first wires between the multi-function vehicle system computer and each of the igniters while in an on position and breaking continuity of the first wires between the vehicle system computer and each of the igniters while in an off position; and a resistor connected to each of the second wires and connected to the switch, so that while in the off position, the switch places the resistors in series between the first and second wires and the vehicle system computer, each of the resistors having an impedance similar to that of one of the igniters, so as to provide a false indication to the vehicle system computer that the continuity exists with the igniters while the switch is in the off position.

2. The airbag system according to claim 1, further comprising an optical signal device connected to the switch that provides an optical signal while the switch is in the off position.

3. The airbag system according to claim 1, wherein the switch portions comprise a pole for each of the first wires, the poles being movable in unison when the switch moves between the on and off positions.

4. The airbag system according to claim 1, further comprising:

a housing adapted to be mounted within a motor vehicle, the switch and the resistors being located within the housing, the switch having a manual engagement portion located on an exterior of the housing for engagement by a user.

5. The airbag system according to claim 1, further comprising:

a housing adapted to be mounted within a motor vehicle, the switch and the resistors being located within the housing, the switch having a manual engagement portion located on an exterior of the housing for engagement by a user; and an optical device connected to the switch that provides an optical signal while the switch is in the off position, the optical signal device being mounted to the exterior of the housing.

6. In a motor vehicle airbag system, having a module with a plurality of igniters for causing an airbag to inflate, the igniters each having an impedance of predetermined value, a multi-function vehicle system computer that monitors the status of the module and registers a fault if the impedance of the igniters in the module varies from the predetermined value, and first and second wires extending between each of the igniters and the vehicle system computer for conveying signals between the module and the vehicle system computer, the improvement comprising:

a break in each of the first wires, interrupting continuity between the vehicle system computer and each of the igniters;

a housing adapted to be mounted in a passenger compartment of the motor vehicle;

a pair of leads for each of the first wires, the leads of each pair having ends connected to one of the first wires on opposite sides of the breaks, each pair of leads extending into the housing;

a manually operable switch mounted in the housing and having a manual engagement actuator on an exterior of the housing, the switch having a pole for each igniter, each of the poles being connected to one of the leads of each of the pairs, each of the poles having an on position that connects the leads of each of the pairs together for providing continuity between the vehicle system computer and each of the igniters, each of the poles having an off position that breaks the connection between the leads of each of the pairs;

a resistor mounted in the housing for each of the igniters, each of the resistors being electrically connected to each of the second wires and connected to the switch, so that while in an off position, the poles place the resistors in a series between the first and second wires and the vehicle system computer, each of the resistors having an impedance similar to that of one of the igniters so as to avoid the register of a fault by the vehicle system computer while the switch is in the off position.

7. The airbag system according to claim 6, further comprising:

an optical signal device connected to the switch that provides an optical signal while the switch is in the off position, the optical signal device being mounted to the exterior of the housing.

8. The airbag system according to claim 7, wherein the switch has three poles and is a double-throw.

9. A method of preventing the registering of a fault signal in a vehicle system computer controlling airbag deployment of a motor vehicle airbag system, the airbag system including a module with a plurality of igniters for causing an airbag to inflate, the vehicle system computer monitoring the status of the module and registering a fault signal if the impedance of the igniters in the module varies from the predetermined value, and first and second wires extending between each of the igniters and the vehicle system computer for conveying signals between the module and the vehicle system computer, the method comprising:

severing each of the first wires between the igniters and the vehicle system computer, creating a pair of ends for each of the first wires;

connecting a portion of a manually operable switch between the ends of each of the first wires;

connecting one side of a resistor to each of the second wires and the other side to the switch, each of the resistors having an impedance similar to that of one of the igniters;

placing the switch in an on position, providing continuity in the first wires between the vehicle system computer and each of the igniters; then placing the switch in an off position, breaking continuity in the first wires between the vehicle system computer and each of the igniters and simultaneously placing the resistors in series between the first and second wires and the vehicle system computer, each of the resistors having an impedance similar to that of one of the igniters, so as to prevent the vehicle system computer from registering a fault signal by providing impedance with the predetermined value while the switch is in the off position.

10. The method as recited in claim 9, further comprising:
providing an illuminated signal while the switch is in the off position.

* * * * *